United States Patent [19]

Kadotani et al.

[11] Patent Number: 4,566,435
[45] Date of Patent: Jan. 28, 1986

[54] SOLAR HEAT COLLECTING APPARATUS

[75] Inventors: Kanichi Kadotani, Atsugi; Yogaku Iwamoto, Hiratsuka, both of Japan

[73] Assignee: Kabushiki Kaisha Komatsu Seisakusho, Tokyo, Japan

[21] Appl. No.: 434,499

[22] Filed: Oct. 15, 1982

[30] Foreign Application Priority Data

| Oct. 15, 1981 | [JP] | Japan | 56-152221[U] |
| Oct. 15, 1981 | [JP] | Japan | 56-152222[U] |
| Feb. 19, 1982 | [JP] | Japan | 57-21377[U] |
| Feb. 26, 1982 | [JP] | Japan | 57-25812[U] |
| Apr. 9, 1982 | [JP] | Japan | 57-50582[U] |

[51] Int. Cl.$^4$ .............................................. F24J 3/02
[52] U.S. Cl. ................... 126/443; 138/113; 126/442; 126/444; 126/448
[58] Field of Search ............... 126/448, 442, 443; 165/109; 138/38, 111, 113, 114, 148; 285/131, 133 R, 47

[56] References Cited

U.S. PATENT DOCUMENTS

| 799,120 | 9/1905 | Way | 138/38 |
| 1,345,758 | 7/1920 | Folsom | 126/438 X |
| 1,606,739 | 11/1926 | Averill | 138/38 |
| 2,033,157 | 3/1936 | Simmons | 285/133 R |
| 2,475,544 | 7/1949 | Del Cueto | 126/443 X |
| 2,478,744 | 5/1949 | Korn | 251/61 X |
| 2,634,759 | 4/1953 | Twicklen | 138/113 |
| 3,552,779 | 1/1971 | Henderson | 285/133 R |
| 3,648,754 | 3/1972 | Sephton | 138/38 X |
| 3,976,508 | 10/1976 | Mlavsky | 126/443 X |
| 3,983,861 | 10/1976 | Beachaine | 138/38 X |
| 4,106,558 | 8/1978 | Neveux | 138/38 X |
| 4,155,346 | 5/1979 | Aresty | 126/447 X |
| 4,278,076 | 7/1981 | Hopper | 126/442 X |
| 4,280,535 | 7/1981 | Willis | 138/114 X |
| 4,324,230 | 4/1982 | Lunsford | 126/448 X |
| 4,326,503 | 4/1982 | Gier et al. | 138/38 X |
| 4,349,013 | 9/1982 | Uroshevich | 138/38 X |
| 4,403,645 | 9/1983 | MacCracken | 126/436 X |

FOREIGN PATENT DOCUMENTS

| 2401390 | 4/1979 | France | 126/448 |
| 2412036 | 8/1979 | France | 126/442 |
| 108046 | 8/1981 | Japan | 126/448 |

Primary Examiner—Larry Jones
Assistant Examiner—Carl D. Price
Attorney, Agent, or Firm—Armstrong, Nikaido, Marmelstein & Kubovcik

[57] ABSTRACT

A solar-heat collecting apparatus of the direct conversion type wherein a black working fluid directly absorbs solar-heat. A plurality of solar-heat collecting tube units are arranged in parallel with each other within a box-like casing. Each tube unit comprises a transparent outer tube and an inner tube mounted within the outer tube with a bottom face of the inner tube being in contact with an inner face of the outer tube. Both ends of each inner tube are closed, forming a fluid passage between each inner and outer tube pair and each end of the respective outer tubes is connected with one of two headers.

4 Claims, 12 Drawing Figures

SOLAR HEAT COLLECTING APPARATUS

BACKGROUND OF THE INVENTION

This invention relates to a solar-heat collecting apparatus. The solar-heat collecting apparatus can be broadly divided into the conventional indirect conversion system employing selective heat absorption membrane, the direct conversion system in which a substance having excellent heat absorption characteristics is used as the heat absorbing fluid, based on a new concept, to which fluid the sun-rays are directed directly to collect the heat thereof, and the heat pipe system etc.

However, the indirect conversion system is based on the principle that the heat collected by the selective heat absorption membrane is transmitted by heat conduction to the fluid and is not so high in efficiency and is also disadvantageous in terms of cost because it requires a considerably high cost in manufacturing the selective heat absorption membrane.

Whilst, the heat pipe system is higher in cost than the indirect conversion system and it is difficult to say that the system is commercially payable.

In contrast thereto, in the case of the direct conversion system, the solar-heat is absorbed directly by the heat absorbing fluid and therefore there is no room for causing the heat losses due to heat transfer etc. which take place in the indirect conversion system.

The solar-heat collection efficiency of this direct conversion system depends largely on the characteristics of the heat absorbing fluid. Preferred examples of the heat absorbing fluid are those disclosed in the Japanese Patent Application No. 56-108854 and the corresponding U.S. application Ser. No. 397,983, filed on the July 14, 1982, issued as U.S. Pat. No. 4,482,467 on Nov. 13, 1984, and assigned to the common assignee of the present application.

The heat-absorbing fluid disclosed in the Japanese and U.S. application comprises:
(a) a dispersing medium selected from the group consisting of propylene glycol, mixture of propylene glycol with water, mixture of propylene glycol with water and glycerin, and mixture of glycerin with water,
(b) a dispersant selected from the group consisting of polyvinylpyrrolidone, caramel, and mixture of polyvinylpyrrolidone with caramel, and
(c) a powdered activated carbon as a black coloring material.

SUMMARY OF THE INVENTION

It is therefore an object of the present invention to provide a solar-heat collecting apparatus which is simple in construction yet can provide an improved solar-heat conversion efficiency.

Another object of the present invention is to provide a solar-heat collecting apparatus of the direct conversion type which can obviate heat losses occuring in the case of indirect conversion type.

In accordance with an aspect of the present invention, there is provided a solar-heat collecting apparatus, comprising: a casing; a plurality of solar-heat collecting tube units arranged in parallel with each other within the casing, each tube unit comprising a transparent outer tube and an inner tube mounted within said outer tube with a bottom face of said inner tube being in contact with an inner face of said outer tube, both ends of said inner tube being closed and both ends of said outer tube being open thereby forming a fluid passage between said outer and inner tubes; and a pair of headers mounted in said casing, one of headers being connected with one side ends of said outer tubes and the other header being connected with the other side ends of said outer tubes whereby solar-heat collecting fluid is adapted to flow within said fluid passages.

Preferably a transparent glazing is mounted on the casing for enclosing the plurality of heat collecting tube units and the solar-heat collecting tube units are arranged spaced apart from each other within the enclosed casing.

The above and other objects, features and advantages of the present invention will be readily apparent from the following description taken in conjunction with the accompanying drawings.

DESCRIPTION OF THE PREFERRED EMBODIMENTS

The present invention will now be described below in detail by way of example only with reference to the accompanying drawings.

Figure 1:
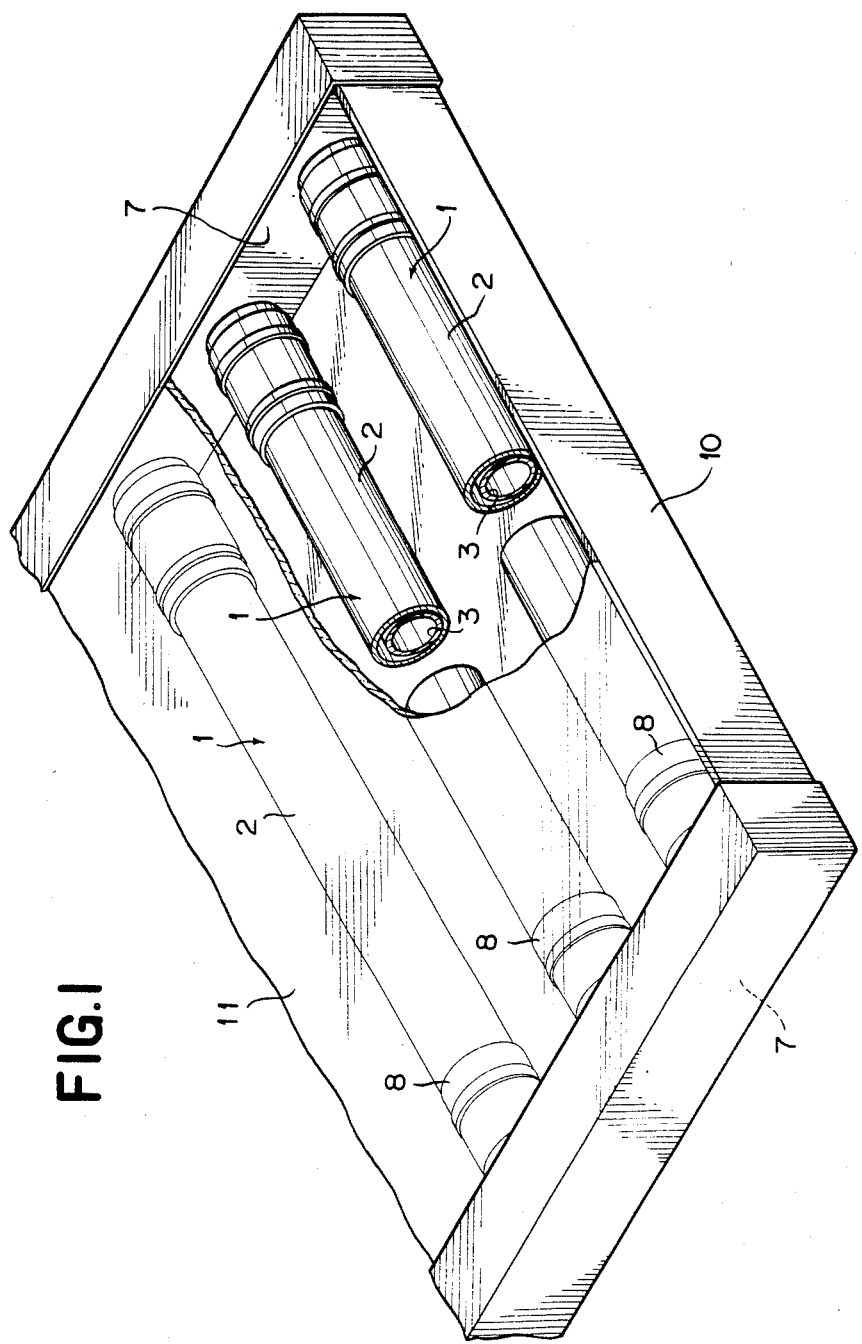
FIG. 1 is a perspective view of a solar-heat collecting apparatus according to the present invention.

Referring first to FIG. 1, there is shown an overall perspective view of a solar-heat collecting apparatus according to the present invention. A plurality of heat collecting tubes 1 are located in juxtaposition in a box 10, both ends of the tubes 1 being connected, respectively, to a header or header tube 7. The upper face of the box 10 is closed by means of a plastic or glazing 11, and the side and bottom surfaces thereof are preferably coated with tin foils in order to enhance the reflection efficiency thereof.

Figure 2:
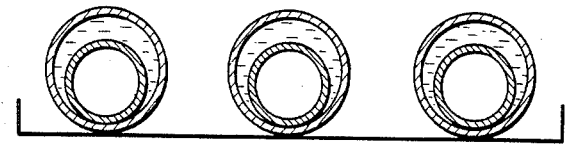
FIG. 2A is a schematical sectional view of a solar-heat collecting tube units arrangement wherein each tube unit is spaced from each other.
FIG. 2B is similar to FIG. 2A but showing another tube units arrangement wherein each tube unit is in contact with adjacent tube units.
Figure 2:
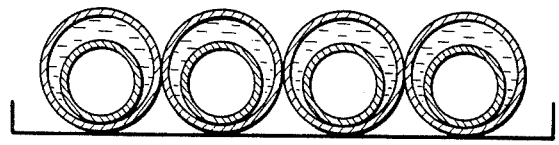

FIG. 2A is a cross-sectional view of the heat collecting tubes shown in FIG. 1 which are spaced apart from each other and each of which comprises an outer tube 2 and an inner tube 3. FIG. 2B shows another example of arrangement in which heat collecting tubes are located in contact with one another.

Figure 3:
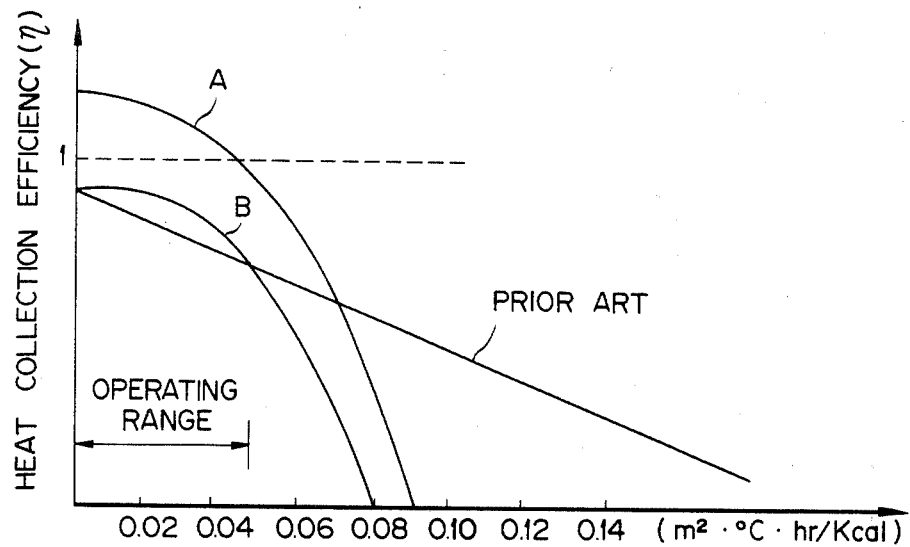
FIG. 3 is a graph showing solar-heat collecting efficiency of two different embodiments of the present invention in comparison with a prior art device.

The solar-heat collecting aparatus of the present invention thus constructed has revealed that it is capable of collecting the solar-heat in the operating range with an excellent efficiency which has not so far been attained. Referring to FIG. 3, there is shown a comparison between the solar-heat collecting apparatus of the present invention and the conventional flat plate type solar-heat collecting apparatus employing a selective absorption membrane. The curve "A" shows the heat collecting efficiency of the apparatus shown in FIG. 2A comprised of spaced apart heat collecting tubes, whilst the curve "B" shows that of the apparatus shown in FIG. 2B comprised of heat collecting tubes arranged in contact with one another. Plotted on the axis of abscissa is $(T_{in} - T_{amb})/I$, wherein $T_{in}$ represents the temperature (°C.) at the inlet of the heat collecting apparatus, $T_{amb}$ the atmospheric temperature (°C.), and I total solar insolation (Kcal/m$^2$.hr).

As is clear from the curves shown in FIG. 3, the efficiency of the solar-heat collecting apparatus of the present invention in the operating range is superior to that of the conventional flat plate type heat collector apparatus using a selective heat absorption membrane. Further, it is obvious from FIG. 3 that the heat collection efficiency of the type comprised of spaced apart heat collecting tubes is superior to that of the type comprised of heat collecting tubes located in contact with one another. This is because, even when the sun-rays are incident obliquely upon the heat collecting tubes, it can be effectively utilized if the tubes are spaced apart. In the case of the curve "A", the heat collection efficiency exceeds 1. This is due to the fact that when the heat collecting tubes are located in spaced apart relationship, even the reflective light from the bottom surface of the box 1 can be made utilized.

Figure 4:
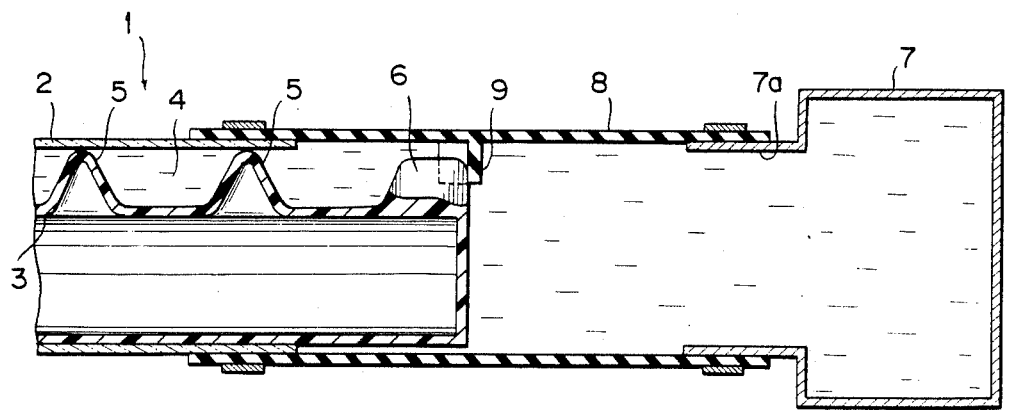
FIG. 4 is a longitudinal sectional view, partly broken, of a solar-heat collecting tube unit according to the present invention.
Figure 5:
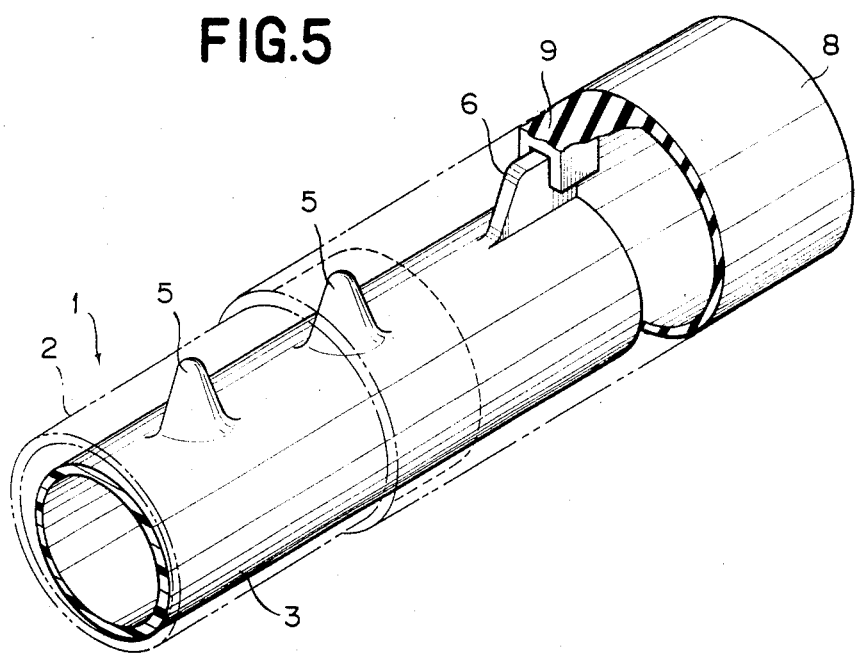
FIG. 5 is a perspective view thereof.

Referring to FIG. 4, there is shown a longitudinal section of the heat collecting tube. In this drawing, reference numeral 1 denotes a heat collecting tube unit comprised of a transparent outer tube 2 and an inner tube 3. The outer tube 2 has a circular cross-section, whilst the inner tube 3 has also a circular cross-section and is inserted into the outer tube 2 with a clearance 4 kept from the inner surface of the latter. Both ends of the inner tube 3 are closed. The inner tube 3 has a plurality of projections 5 formed longitudinally at a spaced interval on the upper face of the inner tube 3 and each having a height slightly smaller than the dimension of the above-mentioned clearance 4. Further, the inner tube 3 has at each end thereof a stopper 6 projecting therefrom.

Reference numeral 7 denotes a header for connecting a plurality of heat collecting tube units 1. The header 7 has a plurality of connecting parts 7a each of which is connected to the outer tube 2 by means of a connecting tube 8 made of a flexible material such as rubber or the like. The inner tube 3 is made longer than the outer tube 2, and the stoppers 6 formed at both ends thereof are located inside the connecting tubes 8. Each stopper 6 engages a retainer 9 projecting inwardly from the inner face of the connecting tube 8. Thus the inner tube 3 is prevented from rotating as well as moving in the longitudinal direction thereof.

It should be noted, however, that the engagement of the stopper and retainer is loose enough to allow slight rotary and longitudinal movements of the inner tube 3.

The embodiment of FIG. 4 shows the case where the outer tube 2 has the same diameter as that of the connecting parts 7a of the header 7, but in the case the diameter of the connecting part 7a is smaller than that of the outer tube 2, it is only necessary to form the connecting tube in a funnel shape so that the outer tube 2 may be connected to the connecting part 7a of the header 7.

Further, the outer tube 2 may be formed from glass or plastic material, if it is transparent. However, the use of glass as the material is preferable when taking into consideration the durability and the change in the performance thereof with lapse of time under such environments that its outer surface is exposed to the surrounding air and its inner surface is always kept in contact with a heating medium. Whilst, it is not always necessary to form the inner tube 3 from a transparent material, but it may be formed from black and white polyethylene. Moreover, it is not always necessary to make the inner tube 3 hollow, but instead the tube may be solid.

Figure 6A:
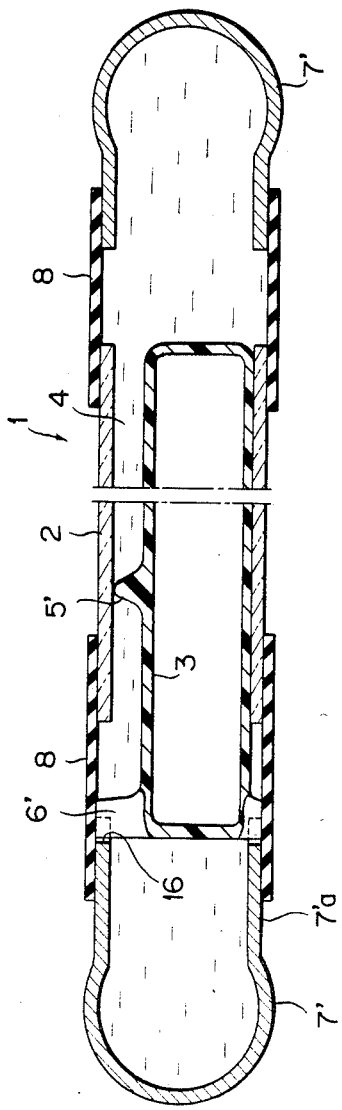
FIG. 6A is a longitudinal sectional view of another embodiment of a solar-heat collecting tube unit of the present invention.
Figure 8:
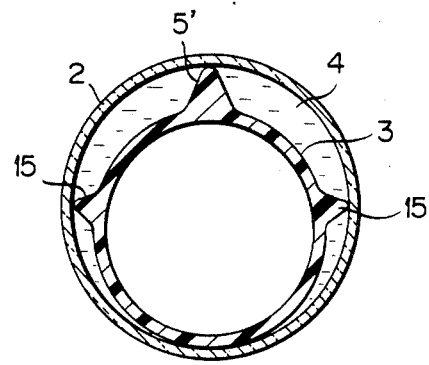
FIG. 8 is a sectional view taken along the line VIII—VIII of FIG. 7.

Referring to FIGS. 6, to 8, there is shown another embodiment of the heat collecting tube and the connecting part of the header of the present invention. In this embodiment, in addition to a plurality of upper projections 5', there are provided a plurality of side projections 15 formed longitudinally on the inner tube 3 to ensure the inner tube 3 to be fixedly secured into the outer tube 2. However, it should be noted that it is not always necessary to provide the side projections 15 in order to achieve the requisite stability of the inner tube 3. Further, in this embodiment, as shown in FIG. 6A, the stopper 6' is provided only at one end of the inner tube 3, and the arrangement is made such that the stopper 6' is fitted in a notch 16 formed in the connecting part 7'a of the left header 7. The purpose of providing the stopper 6' only on one side of the inner tube 3 and making the other side thereof free is to absorb the thermal expansion of the inner tube 3.

However, it is permissible or even recommendable to provide stoppers 6' at both ends of the inner tube 3 if enough play is provided for allowing thermal expansion of the inner tube between the both ends engagements of the stoppers 6' and notches 16.

Figure 7:
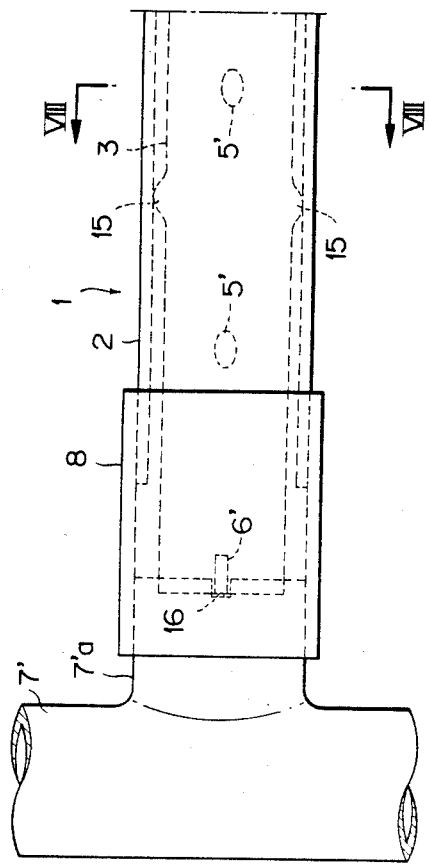
FIG. 7 is a plan view thereof.
Figure 6B:
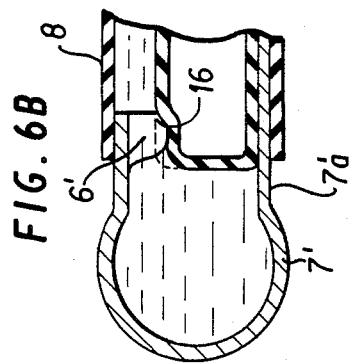
FIG. 6B is a fragmentary longitudinal section of yet another embodiment of a solar-heat collecting tube unit of the present invention.
Figure 9:
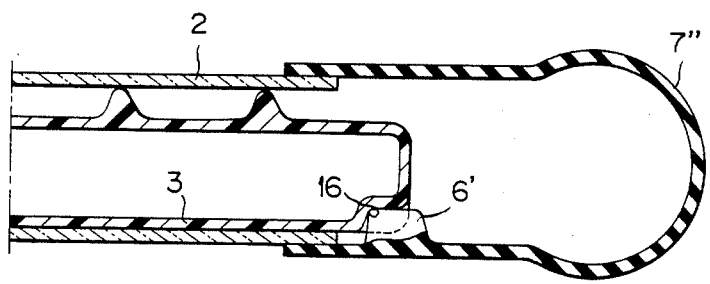
FIG. 9 is a longitudinal sectional view of still another embodiment of a solar-heat collecting tube unit and a header made of a flexible material.

The embodiment shown in FIGS. 6 to 8 can be modified as shown in FIG. 6B to the one in which the inner tube 3 has notches 16 formed at both ends thereof and each connecting part 7'a of the header 7' has a stopper 6' formed thereon. Further, if the header is made of flexible material, it is not necessary to provide connecting tubes. Instead connecting portions of the flexible header 7'' can directly connect both ends of the outer tube 2 as shown in FIG. 9. The stopper 6' formed inwardly on the connecting portion of the header 7'' engages the notch 16 formed in the end portion of the inner tube 3 for securing the inner tube within the outer tube.

Figure 10:
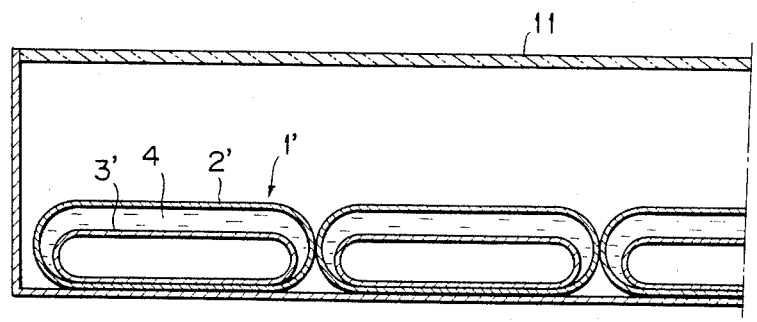
FIG. 10 is a sectional view of still another embodiment of the present invention employing inner and outer tubes having elliptical shape in section.

Further, in order to achieve the effective utilization of the sun-rays, both the outer and inner tubes should desirably be formed in a sectional shape comprised of upper and lower straight sides connected with semi-circles at both ends as shown in FIG. 10. However, it is time-consuming to form the heat collecting tubes in such a configuration, and therefore it is inevitable that the heat-collecting apparatus will become expensive.

While the invention has been described with reference to the particular embodiments, it should be obvious that various changes and modifications are possible to those skilled in the art, so that the invention should not be limited thereto but to be determined by the appended claims.

What is claimed is:

1. A solar-heat collecting apparatus, comprising:
a casing;
a plurality of solar-heat collecting tube units arranged in parallel with each other within the casing, each tube unit comprising a transparent outer tube and an inner tube mounted within said outer tube with a bottom face of said inner tube being in contact with an inner face of said outer tube, both ends of said inner tube being closed to form a hermetically sealed tube, and both ends of said outer tube being open thereby forming a fluid passage between said outer and inner tubes;
a pair of headers mounted in said casing, one of said headers being connected with a first end of each of said outer tubes and the other header being connected with a second end of each of said outer tubes whereby solar-heat collecting fluid is adapted to flow within said fluid passages,
each of said inner tubes having formed thereon a plurality of protrusions arranged at intervals in a longitudinal direction thereof, the height of each of the protrusions being so formed that the diameter of the inner tube at the protrusion is slightly less than the inner diameter of said outer tube,
a plurality of flexible connector tubes each having one end connected to one end of each outer tube and the other end connected to one of said headers,
each of said inner tubes having two stoppers each formed at one of the closed end portions thereof, and
each of said flexible connector tubes having an inwardly projecting slotted retainer having at least one closed end portion for receiving and engaging said stopper thereby preventing each of said inner tubes from rotating as well as from moving in a longitudinal direction thereof.

2. A solar-heating collecting apparatus, comprising:
a casing;
a plurality of solar-heat collecting tube units arranged in parallel with each other within the casing, each tube unit comprising a transparent outer tube and an inner tube mounted within said outer tube with a bottom face of said inner tube being in contact with an inner face of said outer tube, both ends of said inner tube being closed to form a hermetically sealed tube, and both ends of said outer tube being open thereby forming a fluid passage between said outer and inner tubes;
a pair of headers mounted in said casing, one of said headers being connected with a first end of each of said outer tubes and the other header being connected with a second end of each of said outer tubes whereby solar-heat collecting fluid is adapted to flow within said fluid passages,
each of said inner tubes having formed thereon a plurality of protrusions arranged at intervals in a longitudinal direction thereof, the height of each of the protrusions being so formed that the diameter of the inner tube at the protrusion is slightly less than the inner diameter of said outer tube,
each of said headers being formed of a flexible material and having a plurality of flexible connector tube portions integrally formed therewith,
each flexible connector tube portion of said headers having an inwardly projecting stopper, and
wherein each end of said respective inner tubes has formed therein a notch having at least one closed end portion wherein said end portion engages with said respective stoppers thereby preventing each of said inner tubes from rotating as well as from moving in a longitudinal direction thereof.

3. A solar-heat collecting apparatus, comprising:
a casing;
a plurality of solar-heat collecting tube units arranged in parallel with each other within the casing, each tube unit comprising a transparent outer tube and an inner tube mounted within said outer tube with a bottom face of said inner tube being in contact with an inner face of said outer tube, both ends of said inner tube being closed to form a hermetically sealed tube, and both ends of said outer tube being open thereby forming a fluid passage between said outer and inner tubes;
a pair of headers mounted in said casing, one of said headers being connected with a first end of each of said outer tubes and the other header being connected with a second end of each of said outer tubes whereby solar-heat collecting fluid is adapted to flow within said fluid passages,
each of said inner tubes having formed thereon a plurality of protrusions arranged at intervals in a longitudinal direction thereof, the height of each of the protrusions being so formed that the diameter of the inner tube at the protrusion is slightly less than the inner diameter of said outer tube,
a plurality of flexible connector tubes each having one end connected to one end of each outer tube and the other end connected to one of said headers,
each of said inner tubes having a stopper formed at one of the end portions thereof, and
one of said headers having notches each with a closed end portion, each notch disposed adjacent one of said flexible connector tubes and adapted to engage with a stopper of each of said inner tubes to keep the same from rotating.

4. A solar-heat collecting apparatus, comprising:
a casing;
a plurality of solar-heat collecting tube units arranged in parallel with each other within the casing, each tube unit comprising a transparent outer tube and an inner tube mounted within said outer tube with a bottom face of said inner tube being in contact with an inner face of said outer tube, both ends of said inner tube being closed to form a hermetically sealed tube, and both ends of said outer tube being open thereby forming a fluid passage between said outer and inner tubes;
a pair of headers mounted in said casing, one of said headers being connected with a first end of each of said outer tubes and the other header being connected with a second end of each of said outer tubes whereby solar-heat collecting fluid is adapted to flow within said fluid passages,
each of said inner tubes having formed thereon a plurality of protrusions arranged at intervals in a longitudinal direction thereof, the height of each of the protrusions being so formed that the diameter of the inner tube at the protrusion is slightly less than the inner diameter of said outer tube,
a plurality of flexible connector tubes each having one end connected to one end of each outer tube and the other end connected to one of said headers,
each of said inner tubes having a notch with at least one closed end portion formed at one closed end portion of said inner tube, and
one of said headers having a plurality of stoppers, each stopper disposed adjacent each of said flexible connector tubes and engageable with the notch on the inner tube.

* * * * *